United States Patent [19]

Umemoto et al.

[11] Patent Number: 4,916,343
[45] Date of Patent: Apr. 10, 1990

[54] MULTI-PICKUP SENSOR BRACKET FOR MAGNETO

[75] Inventors: Hideki Umemoto; Tsutomu Momoyama; Masayuki Ozawa, all of Himeji, Japan

[73] Assignee: Mitsubishi Denki Kabushiki Kaisha, Tokyo, Japan

[21] Appl. No.: 329,141

[22] Filed: Mar. 27, 1989

[30] Foreign Application Priority Data

Apr. 18, 1988 [JP] Japan .................. 63-96270

[51] Int. Cl.⁴ .................. H02K 1/22; F02P 1/02
[52] U.S. Cl. .................. 310/153; 310/74; 123/149 D
[58] Field of Search .......... 123/149 C, 149 D, 599, 123/602, 601; 310/67 R, 68, 74, 153, 155, 208, 216, 254, 268, 42; 322/51, 4

[56] References Cited

U.S. PATENT DOCUMENTS

| | | | |
|---|---|---|---|
| 3,821,570 | 6/1974 | Burson | 310/153 |
| 4,093,906 | 6/1978 | Draxler | 310/153 |
| 4,114,583 | 9/1978 | Sleder et al. | 123/602 |
| 4,418,677 | 12/1983 | Hofmann | 123/602 |
| 4,727,274 | 2/1988 | Adam et al. | 310/71 |
| 4,779,454 | 10/1988 | Fitzner et al. | 310/153 |
| 4,806,808 | 2/1989 | Grecksch et al. | 310/67 R |

*Primary Examiner*—Patrick R. Salce
*Assistant Examiner*—D. L. Rebsch
*Attorney, Agent, or Firm*—Sughrue, Mion, Zinn, Macpeak & Seas

[57] ABSTRACT

An engine-igniting signal generation apparatus comprises a flywheel rotatable with the crank shaft of an internal combustion engine, a field magnet attached to the flywheel, and a plurality of pickup devices provided facing the field magnet to produce ignition signals in synchronism with the rotation of the flywheel. The cores of the pickup devices are formed by a substrate body of one piece; each coil wound around the cores connects to a terminal, to output the ignition signals, and is covered with an insulating material.

7 Claims, 5 Drawing Sheets

MULTI-PICKUP SENSOR BRACKET FOR MAGNETO

BACKGROUND OF THE INVENTION

The present invention relates to an engine-igniting signal generation apparatus for generating ignition reference signals for a multi-cylinder internal combustion engine.

In a multi-cylinder internal combustion engine, it has been necessary to arrange pickup devices for generating ignition difference signals so as to correspond in number to the number of cylinders.

For instance, six pickup devices were needed for an internal combustion engine having six cylinders. In the conventional technique, therefore, the pickup devices were independently provided so as to correspond in number to the cylinders.

In the conventional technique, there were problems such that the adjusting of angles of the pickup devices when installed was troublesome, errors in angle occurred, and manufacturing cost was increased.

SUMMARY OF THE INVENTION

It is therefore an object of the present invention to provide an engine-igniting signal generation apparatus which makes operations for adjusting the angle of pickup devices unnecessary; assures accurate angles of the same, and allows easy manufacturing.

The foregoing and other objects of the present invention have been attained by providing an engine-igniting signal generation apparatus which comprises:

a flywheel rotatable about the crank shaft of an internal combustion engine, a field magnet attached to the flywheel, and a plurality of pickup devices provided facing the field magnet to produce ignition signals in synchronism with the rotation of the flywheel. Cores of the pickup devices are formed from a one-piece substrate body. A coil is wound around each of the cores and each terminal which is connected to each of the coils is connected to receive the ignition signals. At least part of each terminal and each coil is covered with an insulating material.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings, wherein.

DETAILED DESCRIPTION OF THE PREFERRED EMBODIMENTS

Figure 1:
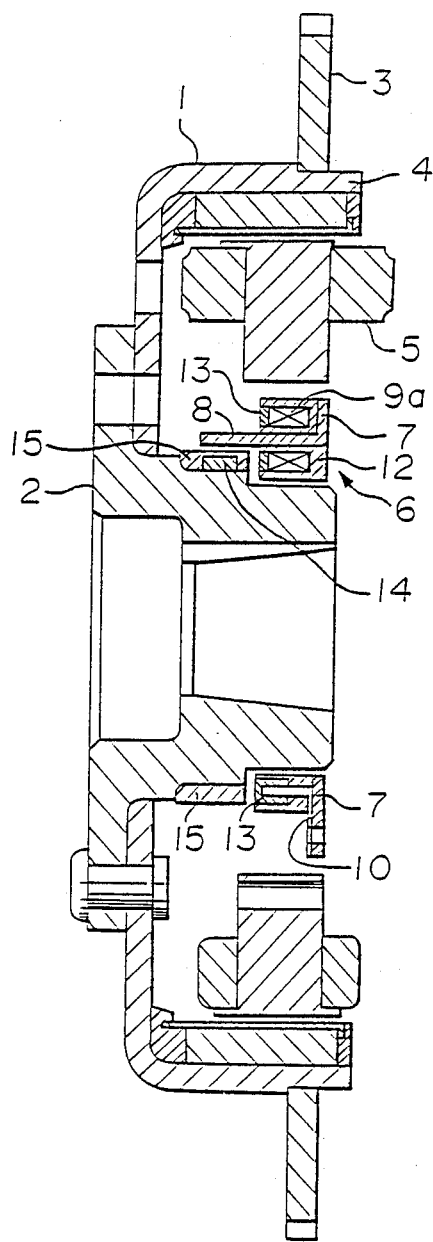
FIG. 1 is a cross-sectional view of an embodiment of the engine-igniting signal generation apparatus according to the present invention.

Referring to the drawings, the same reference numerals designate the same or corresponding parts throughout the several views, and more particularly to FIGS. 1 through 6 thereof, showing preferred embodiments of the engine-igniting signal generation apparatus of the present invention. A boss 2 is attached to a flywheel 1 and is firmly connected to the crank shaft of an internal combustion engine. A ring gear 3 is fixed to the outer periphery of the flywheel 1 and is engaged with a pinion of a starter motor (not shown) when the engine is started. A field magnet 4 is attached to the inner periphery of the flywheel 1 so that it faces a power generation coil 5 which is fixed to the crank casing of the engine (not shown).

A signal generating part 6 produces ignition signals. The signal generating part 6 is fixed to a stator (not shown), and has a base plate 7 in a ring form and a plurality of cores 8 formed integrally with the base plate 7, the core 8 constituting a part of a pickup device. In this embodiment, the signal generating part has six cores 8 usable for an internal combustion engine having six cylinders.

Figure 2:
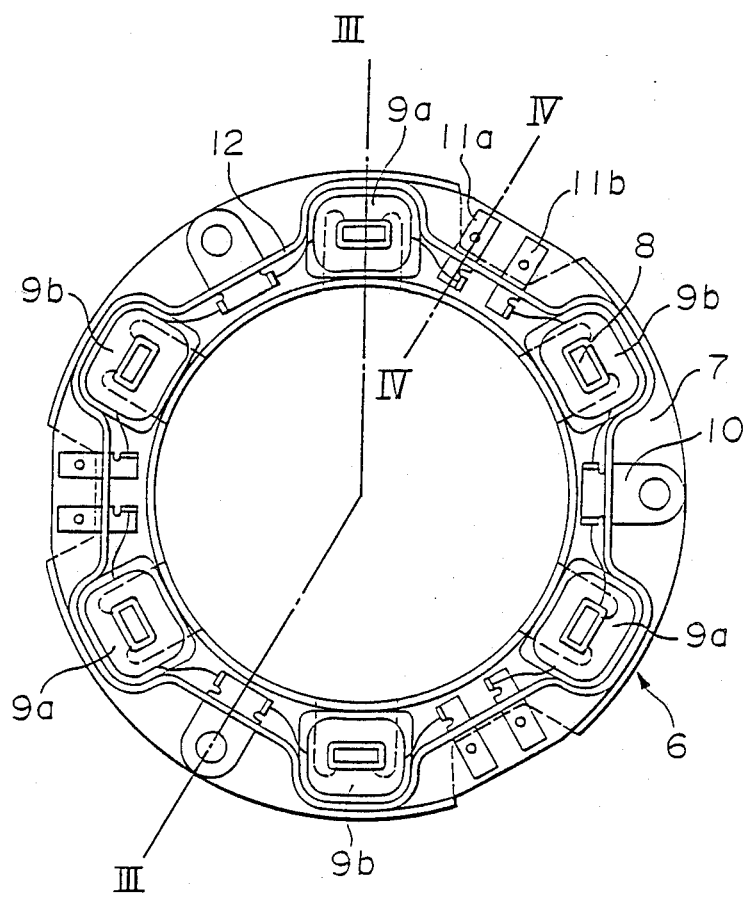
FIG. 2 is a plan view of an embodiment of the signal generating part in the engine-igniting signal generation apparatus of the present invention.
Figure 5:
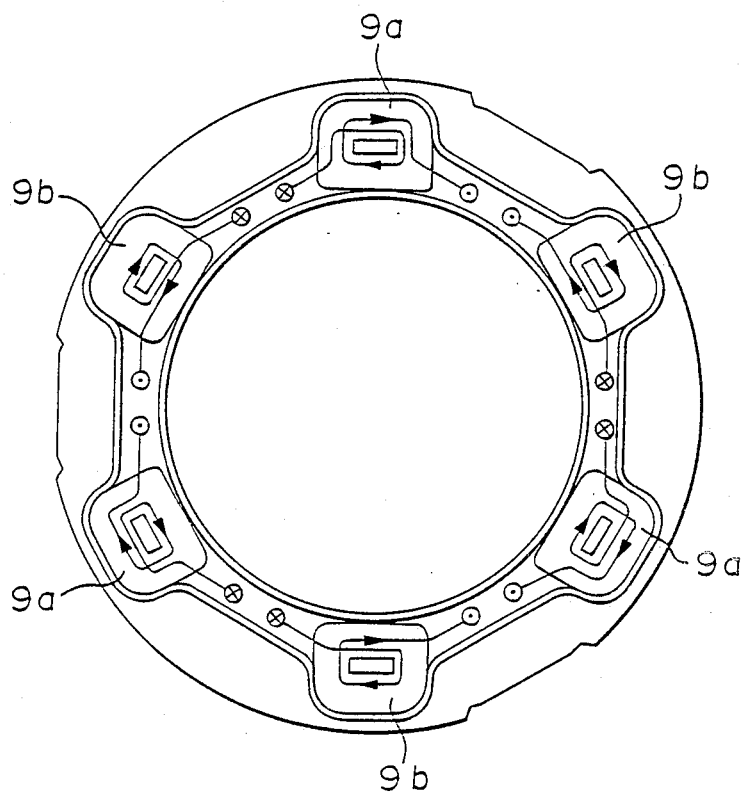
FIG. 5 is a plan view showing the orientation of each coil in the signal generating part.

In FIG. 2, six coils 9a, 9b have the same construction and are respectively arranged on the six cores 8 in an alternate manner along the circumferential direction of the ring-like base plate 7. The coils 9a, 9b are also parts of the pickup devices. The coils 9a and 9b are arranged so that the position of the starting edge of each of the coils 9a is 180° different in phase from that of each of the adjacent coils 9b as shown in FIG. 5. Namely, both starting edges or both finishing edges of the adjacent coils 9a, 9b are in a side-by-side relation. The neighboring starting edges of the adjacent coils 9a, 9b are connected to common ground terminals 10 and the neighboring finishing edges of the adjacent coils 9a, 9b are connected to output terminals 11a or 11b. A mold casing 12 is placed on a surface of the ring-like base plate 7 so as to surround the coils 9a, 9b, the output terminals 11a, 11b and the ground terminals 10, and an insulating material such as resin is filled in the mold casing 12 to cover the coils 9a, 9b, the output terminals 11a, 11b and the ground terminals 10.

In FIG. 1, a magnet 14 is used for generating signals. It is attached to the outer periphery of the boss 2 which is connected to a rotor, the magnet 14 being magnetized in the radial direction. The magnet 14 is fixed to the boss 2 by means of a ring 15 made of aluminum. Thus, a magnetic circuit for generating ignition signals is formed by the magnet 14 and the pickup devices comprising the core 8 and the coil 9a or 9b.

Figure 3:
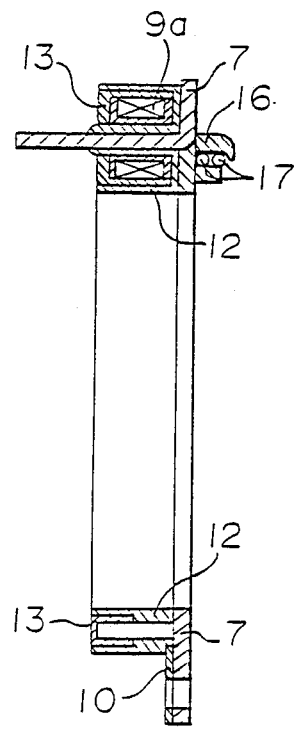
FIG. 3 is a cross-sectional view taken long line III—III shown in FIG. 2.
Figure 4:
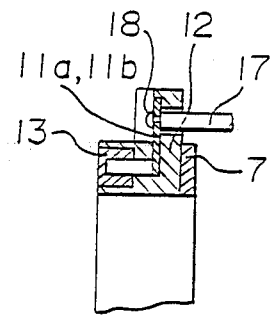
FIG. 4 is a cross-sectional view partly broken taken along line IV—IV shown in FIG. 2.

In FIG. 3, a lead wire supporting section 16 supports lead wires 17 to provide the ignition signals outside. The lead wire supporting section 18 is formed integrally formed with the mold casing 12. In FIG. 4, a connecting part 18 connects the lead wires 17 to the output terminal 11a or 11b.

In the operation of the engine-igniting signal generating apparatus of the present invention, when the engine is started, the pinion of the starter motor is brought to interlock with the ring gear 3 to thereby drive the engine through the flywheel 1 and the boss 2. When the flywheel 1 is rotated, the power generation coil 5 produces power due to change in magnetic flux in the field magnet 4. At the same time, the magnet 14 is rotated along with the boss 2, whereby ignition signals are produced at the coils 9a, 9b in correspondence to each of the cylinders.

Figure 6:
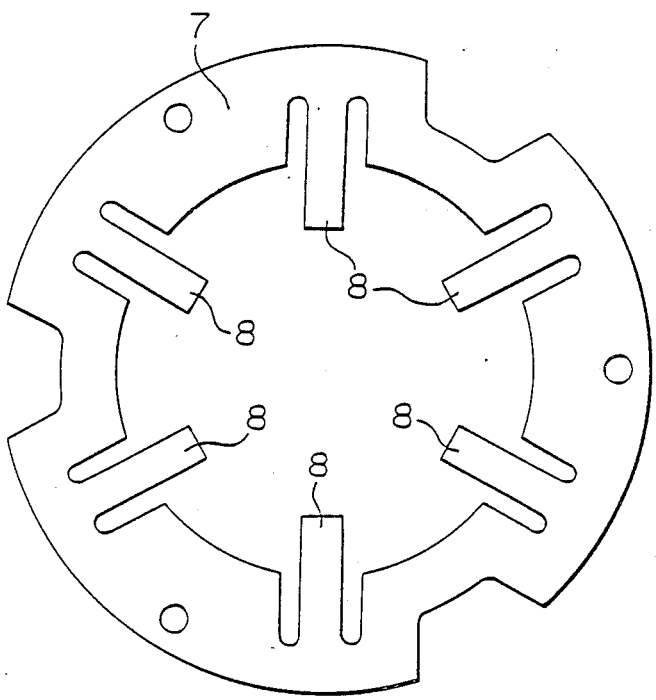
FIG. 6 is a plan view of a metallic sheet to form a base plate and cores in the signal generating part.

The construction of the signal generating part 6 will be described in more detail. As shown in FIG. 6, a metallic plate of magnetic substance is punched out to form a one-piece flat body having a ring-shaped base plate 7 and projections as the cores 8. Then, the projections are bent at substantially a right angle to the base plate 7 in the same direction, to thereby form the cores 8 for six cylinders. Since angular relations in each of the cores 8 are determined by a punch, it is unnecessary to adjust the angle of each of the cores when the pickup devices are installed, and the angular relations of the cores 8 can be obtained with high accuracy. Then, the output terminals 11a, 11b and the ground terminals 10 are attached to the base plate 7 and the mold casing 12 is formed by molding a resinous material. Before forming the mold casing 12, the coils 9a, 9b are arranged on the cores 8 as previously described. Namely, the adjacently positioned coils 9a, 9b are in reverse relation to each other so that the position of the starting edge of the adjacent coils is different. And coil ends of the coils are respectively connected to the output terminals 11a, 11b and the ground terminals 10 which are common to the adjacent coils 9a, 9b. Then, a resinous material 13 is filled in the mold casing 12 under vacuum condition and the resinous material 13 is cured, whereby the coils 9a, 9b, the output terminals 11a, 11b and the ground terminals 10 are fixed together and they are insulated from each other.

In accordance with the present invention, the construction of the engine-igniting signal generation apparatus can be simplified by forming the cores for the pickup devices in one piece. Complicated operations to adjust angular relations among pickup devices become unnecessary, and the angular relations of the pickup devices can be highly accurate.

Since the cores 8 have the common base plate 7, magnetic levels in the pickup devices become stable, so that the outputs of the coils 9a, 9b increase, and noises in the coils 9a, 9b are reduced to thereby increase S/N ratios. Fixing and insulating the coils and the terminals by molding a resinous material can be easily done and improve productivity. Further, manufacturing cost can be reduced.

Since coils having the same construction are used and the ground terminals for the adjacent coils are commonly used, the number of structural elements can be reduced and the construction of the apparatus can be simplified. Manufacturing cost can also be reduced.

In the above-mentioned embodiment, an engine-igniting signal generation apparatus with six pickup devices has been described. However, the number of pickup devices is not limited, and the present invention is applicable to an apparatus having a desired number of pickup devices to provide the same function and effect.

Obviously, numerous modifications and variations of the present invention are possible in light of the above teachings. It is therefore to be understood that within the scope of the appended claims, the invention may be practiced otherwise than as specifically described herein.

What is claimed is:

1. An engine-igniting signal generation apparatus which comprises:
   a flywheel rotatable about the crank shaft of an internal combustion engine;
   a field magnet attached to said flywheel;
   a plurality of pickup devices provided facing said field magnet to produce ignition signals in synchronism with the rotation of said flywheel, cores of said pickup devices being formed from a one-piece substrate body;
   a coil wound around each of said cores;
   one or more terminals which are connected to each of said coils for receiving the ignition signals; and
   an insulating material covering at least part of said terminals and said coils.

2. The engine-igniting signal generation apparatus according to claim 1, wherein said coils used for said pickup devices are identical in structure; each coil being oriented 180° different from adjacent coils in winding direction, said adjacent coils having common ground terminals.

3. The engine-igniting signal generation apparatus according to claim 1, wherein said cores of the pickup devices are formed by bending projections of a punched sheet-like material at an angle of about 90°.

4. The engine-igniting signal generation apparatus according to claim 2, wherein said cores are extended perpendicularly from a base plate in a ring form in the same direction.

5. The engine-ignition signal generation apparatus according to claim 1, wherein said insulating material is a resinous material.

6. The engine-ignition signal generation apparatus according to claim 1, wherein adjacent coils use common ground terminals.

7. The engine-ignition signal generation apparatus according to claim 1, wherein said insulating material is formed in a mold casing which is placed on a surface of said one-piece substrate body.

* * * * *